(12) United States Patent
Higuchi et al.

(10) Patent No.: US 10,052,718 B2
(45) Date of Patent: Aug. 21, 2018

(54) CYLINDRICAL WORKPIECE CUTTING APPARATUS

(75) Inventors: Akinori Higuchi, Tochigi (JP); Akihiro Nemoto, Tochigi (JP); Kazushige Nakatsuka, Tochigi (JP); Katsuyuki Nakajima, Tochigi (JP); Seiichi Sasaki, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 736 days.

(21) Appl. No.: 13/348,190

(22) Filed: Jan. 11, 2012

(65) Prior Publication Data

US 2012/0205353 A1 Aug. 16, 2012

(30) Foreign Application Priority Data

Feb. 10, 2011 (JP) ................................. 2011-027755
Feb. 10, 2011 (JP) ................................. 2011-027756
Feb. 14, 2011 (JP) ................................. 2011-028577

(51) Int. Cl.
*B23K 26/16* (2006.01)
*B23K 26/38* (2014.01)
*B23K 26/08* (2014.01)

(52) U.S. Cl.
CPC .......... *B23K 26/16* (2013.01); *B23K 26/0823* (2013.01); *B23K 26/0884* (2013.01); *B23K 26/38* (2013.01)

(58) Field of Classification Search
CPC ............ B23K 26/0604; B23K 26/0621; B23K 26/0613; B23K 26/0823; B23K 26/0884; B23K 26/16; B23K 26/38; H02G 1/128

USPC ... 219/59.1, 121.61–121.62, 121.67–121.69, 219/121.72, 121.76, 121.78, 219/121.81–121.82, 160–161; 264/400; 372/50.1–50.23

See application file for complete search history.

(56) References Cited

U.S. PATENT DOCUMENTS 1,348,434 A * 8/1920 Marshick ...................... 373/101
3,482,075 A * 12/1969 Wilde ........................ 219/121.68
(Continued)

FOREIGN PATENT DOCUMENTS

CN 1458872 11/2003
CN 101462390 6/2009
(Continued)

OTHER PUBLICATIONS

Chinese Office Action dated Mar. 7, 2014, 9 pages.
Japanese Office Action dated Sep. 9, 2014, 3 pages.
Japanese Office Action dated Aug. 26, 2014, 2 pages.

*Primary Examiner* — Tu B Hoang
*Assistant Examiner* — Thomas Ward
(74) *Attorney, Agent, or Firm* — Rankin, Hill & Clark LLP

(57) ABSTRACT

A cylindrical workpiece cutting apparatus is provided with a holder in which a metal made cylindrical workpiece is mounted on an outer periphery of the holder and which is adapted to hold the workpiece over an entire length of the workpiece; annular recesses formed on the outer periphery of the holder at a predetermined interval; a laser outputting part provided at a position opposed to the holder and adapted to output laser beam to the workpiece; and a cover portion provided on surfaces of the annular recesses and adapted to prevent attachment of metal particles which are scattered during cutting the workpiece by the laser beam.

2 Claims, 10 Drawing Sheets

(56) References Cited

U.S. PATENT DOCUMENTS

| | | | | |
|---|---|---|---|---|
| 3,534,472 | A | * | 10/1970 | Jong et al. .................. 29/620 |
| 3,597,578 | A | * | 8/1971 | Sullivan et al. ......... 219/121.67 |
| 3,604,890 | A | * | 9/1971 | Mullaney et al. ....... 219/121.67 |
| 3,626,140 | A | * | 12/1971 | Peyrot .................... 219/121.13 |
| 4,092,016 | A | * | 5/1978 | Roeder .................. B23K 7/10 266/77 |
| 4,387,845 | A | * | 6/1983 | Mefferd .................... 228/222 |
| 4,498,917 | A | * | 2/1985 | Weinstein et al. ............. 65/382 |
| 4,625,093 | A | * | 11/1986 | Chryssolouris ...... B28D 1/221 219/121.69 |
| 4,719,329 | A | * | 1/1988 | Matsuno et al. ........ 219/121.64 |
| 4,769,522 | A | * | 9/1988 | Lentz et al. ............ 219/121.63 |
| 4,781,770 | A | * | 11/1988 | Kar ............................. 148/220 |
| 4,827,947 | A | * | 5/1989 | Hinz ............................ 131/281 |
| 4,931,135 | A | * | 6/1990 | Horiuchi et al. ............... 216/67 |
| 5,149,936 | A | * | 9/1992 | Walton, II ............... 219/121.65 |
| 5,149,937 | A | * | 9/1992 | Babel et al. ............ 219/121.68 |
| 5,231,256 | A | * | 7/1993 | Yamagiwa et al. ............ 218/63 |
| 5,286,006 | A | * | 2/1994 | Ogura ........................... 266/77 |
| 5,376,213 | A | * | 12/1994 | Ueda et al. ............. 156/345.27 |
| 5,460,284 | A | * | 10/1995 | Foltz et al. ..................... 216/65 |
| 5,554,415 | A | * | 9/1996 | Turchan et al. .......... 427/248.1 |
| 5,582,749 | A | * | 12/1996 | Mori et al. .............. 219/121.84 |
| 5,628,926 | A | | 5/1997 | Belgacem et al. |
| 5,662,762 | A | * | 9/1997 | Ranalli ................ B08B 7/0042 156/707 |
| 5,994,667 | A | | 11/1999 | Merdan et al. |
| 6,288,355 | B1 | * | 9/2001 | Bonsen ........................... 219/81 |
| 6,469,729 | B1 | * | 10/2002 | Ryan ............................ 347/248 |
| 6,559,413 | B1 | * | 5/2003 | Muenchausen et al. 219/121.72 |
| 7,262,385 | B2 | * | 8/2007 | Fuson ...................... 219/121.6 |
| 8,222,563 | B2 | | 7/2012 | Stegemann et al. |
| 2002/0148819 | A1 | * | 10/2002 | Maruyama et al. ..... 219/121.78 |
| 2003/0176154 | A1 | | 9/2003 | Narusaki et al. |
| 2004/0159637 | A1 | * | 8/2004 | Herke et al. ............. 219/121.18 |
| 2004/0178180 | A1 | * | 9/2004 | Kaji et al. ................ 219/121.43 |
| 2005/0161446 | A1 | * | 7/2005 | Fuson ...................... 219/121.82 |
| 2006/0043622 | A1 | * | 3/2006 | Kumazawa et al. ........... 264/1.1 |
| 2006/0255025 | A1 | | 11/2006 | Morikazu |
| 2007/0145026 | A1 | * | 6/2007 | Murase et al. ........... 219/121.84 |
| 2008/0210675 | A1 | * | 9/2008 | Sasaki et al. ............ 219/121.84 |
| 2010/0200551 | A1 | * | 8/2010 | Nakajima .......... B23K 26/0823 219/121.72 |
| 2010/0206858 | A1 | | 8/2010 | Stegemann et al. |

FOREIGN PATENT DOCUMENTS

| | | |
|---|---|---|
| CN | 101642829 | 2/2010 |
| CN | 201423509 | 3/2010 |
| CN | 101797664 | 8/2010 |
| JP | 57-177896 | 11/1982 |
| JP | 4-157083 A | 5/1992 |
| JP | 7-308791 A | 11/1995 |
| JP | 08-039279 | 2/1996 |
| JP | 11-267866 A | 10/1999 |
| JP | 2008-212953 | 9/2008 |
| JP | 2010-017746 | 1/2010 |
| WO | 2009/033497 | 3/2009 |
| WO | 2010/057360 | 5/2010 |

* cited by examiner

CYLINDRICAL WORKPIECE CUTTING APPARATUS

BACKGROUND OF THE INVENTION

Field of the Invention

The invention relates to a cylindrical workpiece cutting apparatus, which cuts a metal made cylindrical workpiece into a plurality of metal rings.

Related Art

As a cylindrical workpiece cutting apparatus, an apparatus in which a cylindrical workpiece obtained by bonding both end edges of a metal thin plate is cut by irradiating the workpiece which is rotating with laser beam into ring shapes to form a plurality of metal rings is known (for example, refer to Patent Documents 1 and 2).
[Patent Document 1] US 2010/0200551
[Patent Document 2] JP-A-57-177896

The workpiece is rotated by holding the workpiece from an inner surface of the workpiece by a workpiece holder having a cylindrical outer surface and rotating the workpiece holder around an axis of a cylinder. The workpiece holder is provided with a plurality of slits extending in an axial direction, so that a diameter thereof can be elastically changed. The workpiece is held by disposing the inner surface of the workpiece to face the outer surface of the workpiece holder and enlarging the diameter of the workpiece holder.

During cutting the workpiece as described above, the metal configuring the workpiece is melted by the laser beam, is scattered as sputters or re-solidified and then is attached to cut parts as dross. In order to solve the problem, a hood has been provided to prevent the scattering of the sputters or a cooling medium for suppressing generation of the melted metal has been supplied.

For example, according to the cylindrical workpiece cutting apparatus disclosed in Patent Document 1, a passage for cooling medium is formed in a sidewall of a holding member that holds and rotates the cylindrical workpiece and the cooling medium is enabled to flow in the passage and to thus cool the workpiece, thereby avoiding the melting of the workpiece except for the cut part and suppressing the generation of the dross or sputters.

In the above apparatus, sublimated metal gas and melted metal, which are generated by the irradiation of the laser beam to the workpiece, are also sucked by a suction nozzle together with compressed air discharged from a discharge nozzle or the above cooling medium, so that the cut part remains to be clean.

However, even when the cooling medium is supplied or the suction is made by the suction nozzle, there may be cases the attachment of the dross ca not be prevented. The inevitably occurring sputters may be introduced into the workpiece holder through the slits, thereby interfering with the smooth enlargement/reduction of the diameter of the workpiece holder.

The sputters may also be attached and deposited in annular recesses of the workpiece holder, so that the holder and the workpiece or metal ring may contact each other. Thereby, a movement of the workpiece or metal ring relative to the holder is impeded or the workpiece or metal ring is damaged.

SUMMARY OF THE INVENTION

One or more embodiments of the invention relate to a cylindrical workpiece cutting apparatus capable of preventing sputters from being attached in annular recesses of a holder.

Also, one or more embodiments of the invention relate to a cylindrical workpiece cutting apparatus capable of preventing interference of smooth enlargement/reduction of a diameter of a workpiece holder, which interference is caused due to sputters.

In addition, one or more embodiments of the invention relate to a cylindrical workpiece cutting apparatus capable of reducing generation of dross and simply collecting sputters without difficulty.

DETAILED DESCRIPTION OF THE EMBODIMENTS

Hereinafter, exemplary embodiments of the invention will be described with reference to the drawings. The exemplary embodiments described herein are not intended to limit the invention but only to exemplify the invention, and all features or combinations of the features of the embodiments are not always essential to the invention.

First Exemplary Embodiment

Figure 1:
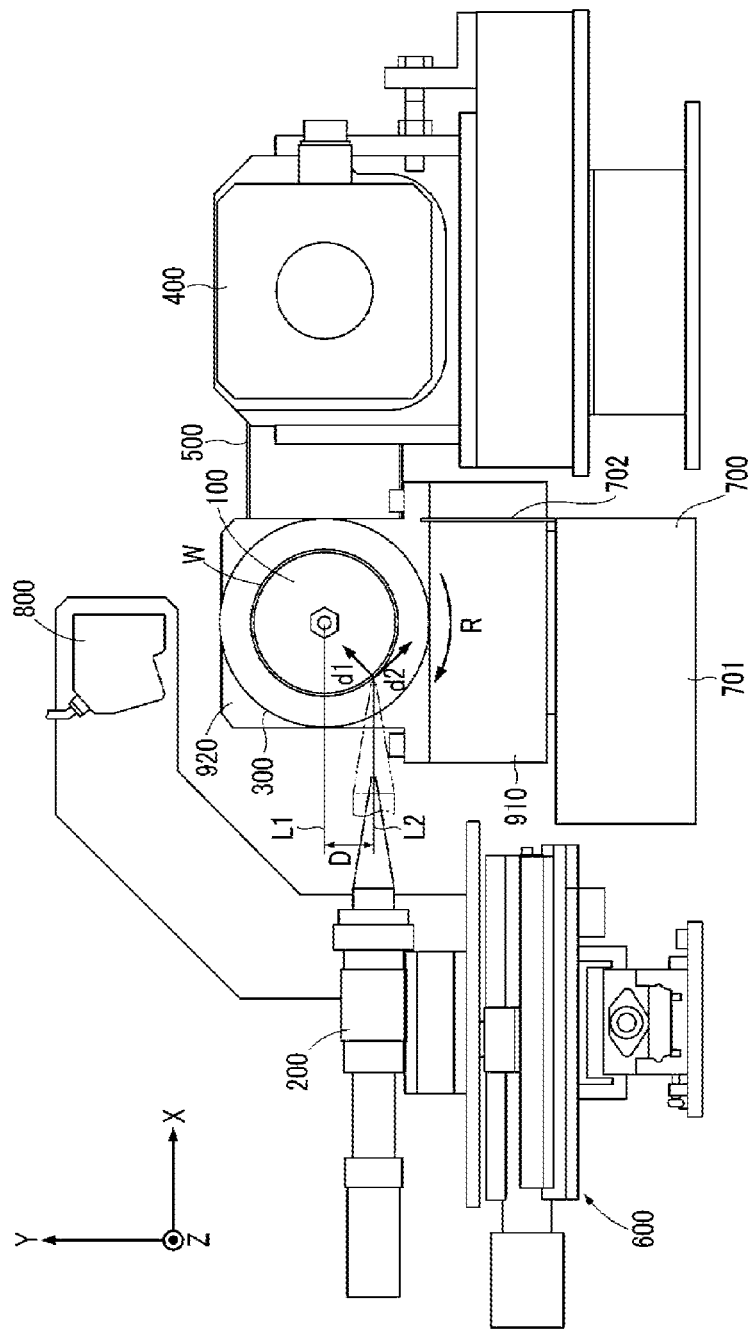
FIG. 1 is a front view of a cylindrical workpiece cutting apparatus according to a first exemplary embodiment.

FIG. 1 is a front view of a cylindrical workpiece cutting apparatus according to a first exemplary embodiment. As shown in FIG. 1, the apparatus includes a holder 100 that holds a cylindrical workpiece W and is rotatable along a circumference of a cylindrical shaft thereof, a processing head 200 (laser outputting part) that outputs laser beam to the workpiece W being rotated by the holder 100 and thus cuts the workpiece W into a ring shape, a spindle 300 that is coupled to a base end of the holder 100 and a motor 400 that rotates the spindle 300.

A rotational shaft of the motor 400 and the spindle 300 are provided with pulleys (not shown), respectively. A timing belt 500 extends between the pulleys and the spindle 300 is adapted to rotate as the motor 400 rotates. A dust collection apparatus 700 that collects sputters, which are generated in cutting the workpiece W, is provided below the holder 100. In the meantime, the motor 400, the spindle 300, the holder 100 and the like configure a rotation mechanism.

The dust collection apparatus 700 has a rectangular parallelepiped (for example, box shape) dust collection part 701 having an opened upper surface and a flat plate-shaped reflection part 702 that reflects sputters scattering in a predetermined direction toward the dust collection part 701. The dust collection apparatus 700 is arranged at a position at which the dust collection part 701 is positioned below the holder 100 and the reflection part 702 can reflect the sputters scattering in the predetermined direction toward the dust collection part 701.

The cylindrical workpiece cutting apparatus further includes an XYZ stage 600 that holds the processing head 200 and moves the same in X, Y and Z directions. A laser sensor 800 that measures a diameter of the workpiece W is provided on the XYZ stage 600. A controller of the cylindrical workpiece cutting apparatus controls a position of the processing head 200 in the X axis direction by the XYZ stage 600 so that a focus of the laser beam is positioned to appropriately cut the workpiece W, based on an output of the laser sensor 800.

The workpiece W is formed into a cylindrical shape by bonding both ends of a rectangular metal thin plate. The workpiece W is cut to have a predetermined width by the cylindrical workpiece cutting apparatus and is thus processed to a metal ring configuring a metal belt for CVT. As the metal thin plate, maraging steel having a thickness of about 0.3 to 0.4 mm is used, for example.

Figure 2:
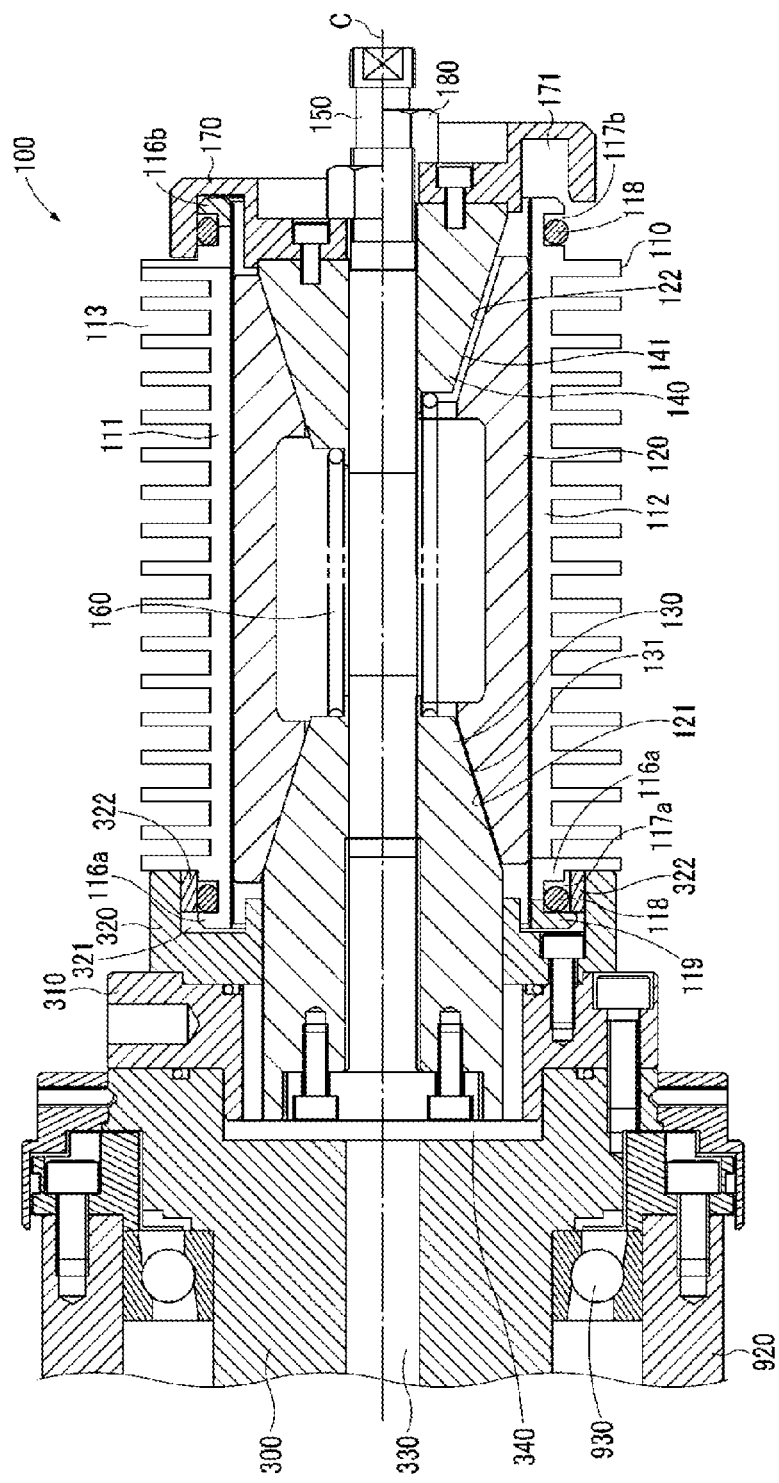
FIG. 2 is a sectional view of a holder of the apparatus shown in FIG. 1.

FIG. 2 is a sectional view of the holder 100 taken along a plane including the rotational shaft. As shown in FIG. 2, the holder 100 includes a substantially cylindrical holding member 110 that supports the workpiece W while abutting on an inner surface of the workpiece, a substantially cylindrical pressing member 120 that presses an inner wall of the holding member 110, a first diameter changing member 130 and a second diameter changing member 140 that have conical surfaces (outer conical surfaces) 131, 141 for changing a diameter of the pressing member 120, respectively, and a connection bar 150 and a coil spring 160 for adjusting a position between the first diameter changing member 130 and the second diameter changing member 140.

FIG. 3(*a*) is a sectional view of the holding member 110 and FIG. 3(*b*) is a view showing the holding member 100, which is seen from a base end thereof that is the left side of FIG. 3(*a*). Also, FIG. 3(*c*) is a view showing first slits 111 formed from the base end of the holding member 110 to an adjacency of a leading end thereof, which is seen from an outside of the holding member 110 in a direction perpendicular to the rotational shaft of the holding member 110. FIG. 3(*d*) is a view showing second slits 112 formed from the leading end of the holding member 110 to an adjacency of the base end, which is seen from the outside.

The same numbers, for example, the eight first slits 111 and the eight second slits 112 are alternately arranged, respectively, so that the holding member 110 can be elastically expanded and contracted in a radial direction thereof. An outer periphery of the holding member 110 is formed with a plurality of annular recesses 113 at a predetermined interval in the rotational axis direction. The respective annular recesses 113 intersect with the first slits 111 and the second slits 112. The irradiation of the laser beam by the processing head 200 is performed for the workpiece W part positioned on the annular recesses 113.

A band-shaped sheet 114 that blocks the first slits 111 and the second slits 112 is provided on an inner wall of the holding member 110 from the base end of the holding member 110 to the leading end thereof. The sheet 114 is provided for each of the first slits 111 and each of the second slits 112. Accordingly, a concave portion 115 for accommodating the sheet 114 is provided on the inner wall of the holding member 110.

The slit 114 has a function of preventing the sputters, which are generated when the workpiece W on the first slits 111 and the second slits 112 is cut by the irradiation of the laser beam, from being introduced to the inside through the first slits 111 and the second slits 112. Accordingly, as the sheet 114, a sheet is used which is made of a material that has elasticity not to disturb the expansion and contraction of the holding member 110 and heat resistance against the sputters and to which the sputters are not attached.

For example, a Teflon (registered trademark) sheet having a thickness of about 0.5 mm is used as the material of the sheet. Alternatively, a sheet having Teflon (registered trademark) coated thereto may be also used.

The adjacencies of the base end and leading end of the holding member 110 are formed with small diameter portions 116*a*, 116*b* having a smaller diameter than a support surface supporting the workpiece W. The small diameter portions 116*a*, 116*b* are formed with circumferential recesses 117*a*, 117*b* over entire circumferences thereof. O-rings 118 (refer to FIG. 2) contracting the holding member 110 are arranged in the circumferential recesses 117*a*, 117*b*, thereby urging the holding member 110 in the contraction direction.

A part of the small diameter portion 116*a* closer to the base end than the circumferential recess 117*a* is provided with convex parts 119 in the circumferential direction over a predetermined angle range. The convex parts 119 are provided at two places of the base end-sides of the two second slits 112 located at an interval of 180°.

As shown in FIG. 2, the holding member 110 is connected to the spindle 300 through two ring-shaped connection members 310, 320 fixed to a leading end of the spindle 300. Thus, the connection member 320 has an annular insertion hole 321 at an end portion facing the holding member 110. An outer circumferential wall of an entrance of the insertion hole 321 is configured by a small diameter portion 322, except for introduction parts corresponding to the convex parts 119.

When the small diameter portion 116*a* is fitted and rotated in the insertion hole 321 of the connection member 320 so that the convex parts 119 correspond to the introduction parts, the convex parts 119 are prevented from being axially moved by the small diameter portion 322, so that the holding member 110 is fixed to the connection member 320.

An outer periphery of the pressing member 120 is opposed to an inner wall of the holding member 110 so that it can press the inner wall. An inner side of the pressing member 120 facing the base end side is formed with a conical surface (inner conical surface) 121 that corresponds to the conical surface 131 of the first diameter changing member 130. An inner side of the pressing member 120 facing the leading end side is formed with a conical surface (inner conical surface) 122 that corresponds to the conical surface 141 of the second diameter changing member 140. Both vertices of the conical surfaces 121, 122 face the center of the pressing member 120.

The pressing member 120 is formed with base end-side slits (not shown) that extend from the base end-side end surface to the adjacency of the leading end along the cylindrical axis direction. Likewise, leading end-side slits are also formed from the leading end-side den surface to the adjacency of the base end along the cylindrical axis direction. The same numbers, for example, the twelve base end-side slits and the twelve leading end-side slits are alternately arranged in the circumferential direction, respectively, so that the pressing member 120 can be elastically expanded and contracted in a radial direction thereof.

The first diameter changing member 130 has a cylindrical part at the base end-side and a conical frustum part positioned at a leading end side of the cylindrical part and having the conical surface 131. A diameter of the cylindrical part and a diameter of a bottom surface of the conical frustum part are the same and both of the parts are connected without a step. The connection bar 150 penetrates a central axis of the first diameter changing member 130. A base end portion of the connection bar 150 is fixed to the base end portion of the first diameter changing member 130.

The second diameter changing member 140 has a conical frustum shape and forms the conical surface 141. The connection bar 150 penetrates a central axis of the second diameter changing member 140. The coil spring 160 is interposed between a vertex portion of the conical frustum part of the first diameter changing member 130 and a vertex portion of the second diameter changing member 140 having the conical frustum, thereby urging the diameter changing members in a direction away from the diameter changing members. The connection bar 150 penetrates the inside of the coil spring 160.

A disc-shaped cover member 170 is fixed to the bottom surface of the second diameter changing member 140 having the conical frustum shape. An outer periphery of the cover member 170 is formed with an annular fitting recess 171 into which the small diameter portion 116b of the holding member 110 can be fitted.

The connection bar 150 penetrates a center of the cover member 170. By a nut 180 fitted on a part of the connection bar 150 adjacent to an axially outer side of the cover member 170, it is possible to adjust a position of the first diameter changing member 130 relative to the cover member 170.

The spindle 300 is supported by a support member 920 on a basis 910 (refer to FIG. 1). A bearing 930 is interposed between the support member 920 and the spindle 300. Thereby, the spindle 300 is adapted to rotate around a rotational axis thereof.

The spindle 300 is formed with a through-hole 330 on a central axis thereof so as to supply air into the holder 100. A gap is formed between the cylindrical part of the first diameter changing member 130 and the spindle 300, the first connection member 310, the second connection member 320 and the base end portion of the holding member 110. The through-hole 330 communicates with the gap. Thereby, an air supply path 340 is formed from the through-hole 330 of the spindle 300 to the first slits 111 and the second slits 112 of the holding member 110.

An end portion of the through-hole 330 opposite to the holder 100 is connected to an air line (not shown). The air line is connected to a compressed air supply source that supplies compressed air as the cooling medium.

Figure 4A:
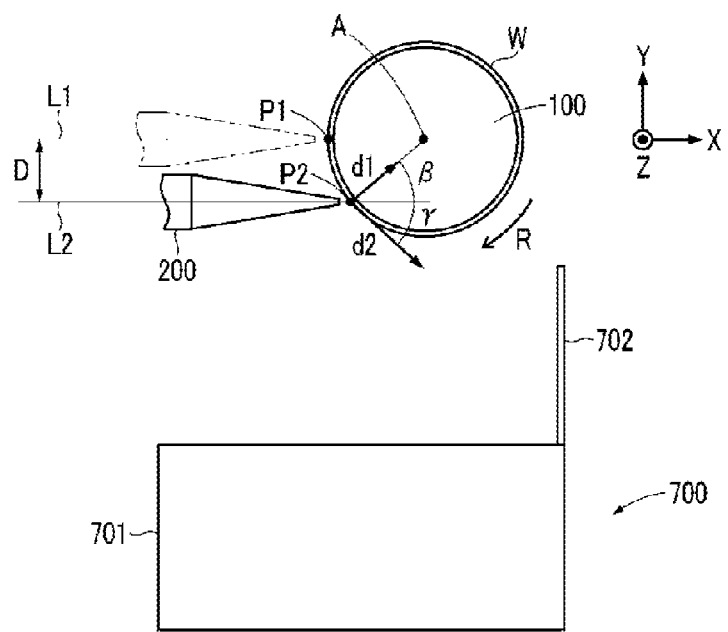
FIG. 4(a) is a view showing a positional relation of a processing head, a workpiece and a dust collection apparatus of the apparatus shown in FIG. 1.

FIG. 4(a) shows a positional relation of the processing head 200, the workpiece W and the dust collection apparatus 700. A reference numeral A in FIG. 4(a) indicates a rotational axis of the workpiece W (holding member 110), a reference numeral R is an arrow indicating a rotating direction of the workpiece W, a reference numeral P1 is an irradiation position on the workpiece W when the laser beam is output toward the rotational axis A by the processing head 200 and P2 is an actual irradiation position of the laser beam to the workpiece W when cutting the workpiece W.

As shown in FIG. 4(a), when cutting the workpiece W, a position of the processing head 200 in the Y axis direction is controlled so that the irradiation position of the laser beam to the workpiece W by the processing head 200 becomes the predetermined more upstream irradiation position P2 with respect to the rotating direction R of the workpiece W than the irradiation position P1 when the laser beam is output toward the rotational axis A of the workpiece W. The workpiece W is cut in a direction opposite to the rotating direction R, i.e., toward the upstream side of the rotating direction R.

Figure 4B:
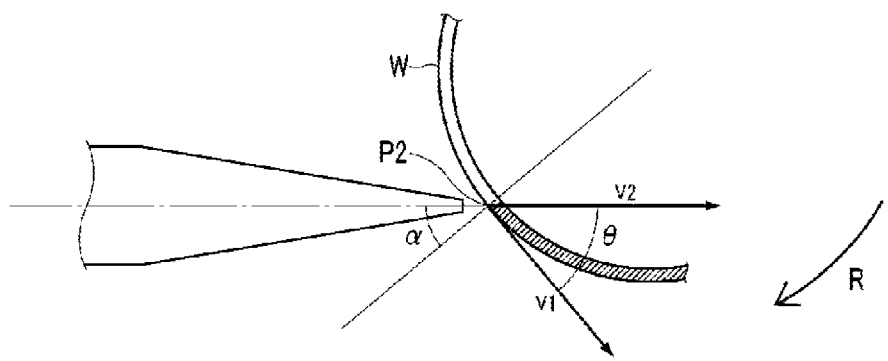
FIG. 4(b) is a view showing an aspect that a workpiece is cut by laser beam.

At this time, as shown in FIG. 4(b), it can be thought that the cutting direction of the workpiece W by the irradiation of the laser beam to the irradiation position P2 is a direction v1 that abuts on a surface of the workpiece W at the irradiation position P2 and is opposite to a direction along which the surface of the workpiece moves, in a plane including the irradiation position P2 and perpendicular to the rotational axis A.

Accordingly, when an incident direction of the laser beam onto the irradiation position P2 is indicated with v2, an angle between the vectors v1 and v2 is an acute angle $\theta$ corresponding to the irradiation position P2. Expressing with an incident angle $\alpha$ of the laser beam to the irradiation position P2, $\theta=90°-\alpha$.

When cutting the workpiece W, in order to satisfy the positional relation between the processing head 200 and the workpiece W, the processing head 200 is translated so that an optical axis of the processing head 200 is moved from a position on a line L1 facing the rotational axis A of the workpiece W (holding member 110) to a position on a line L2 spaced by a predetermined distance D in a negative direction of the Y axis, as shown in FIG. 4(a).

The distance D is set so that dross is difficult to attach the cut part, based on a thickness, rotating speed and the like of the workpiece W. That is, before cutting the workpiece W, the controller acquires the distance D, based on the thickness, rotating speed and the like of the workpiece W to be cut, and controls the XYZ stage 600 to locate the processing head 200 on a position on the line L2.

The distance D can be acquired by referring to a correspondence table that is prepared based on trial data acquired by cutting the various workpieces W on trial under various conditions in advance. The trial data includes the material, thickness and rotating speed of the workpiece W in each trial, a slope of a drag line caused on the workpiece W, a moving distance d that the processing head 200 has moved from the position on the line L1 in the negative direction of the Y axis, a height of the dross attached to the cut part, and the like.

In the meantime, the drag line is a laminated line that is formed on a cut surface when melted metal, which is generated in cutting the workpiece W by the laser beam, is solidified. The slope of the drag line relates to an attachment amount of the dross to the part that is cut by the laser beam. The more vertical the drag line relative to the surface of the workpiece W, it indicates that the attachment amount of the dross is less.

Based on the trial data, for each material of the workpiece W, the correspondence table is prepared in which the slope of at least one drag line, the thickness of the workpiece W corresponding to the slope, the rotating speed of the holding member 110 (workpiece W) and the distance D are associated with each other. Regarding the slope of at least one drag line included in the table, a value when the attachment amount of the dross is less is adopted.

In the meantime, instead of the distance D, the incident angle α corresponding to the distance D or acute angle θ (=90°−α) may be used.

Figure 3A:
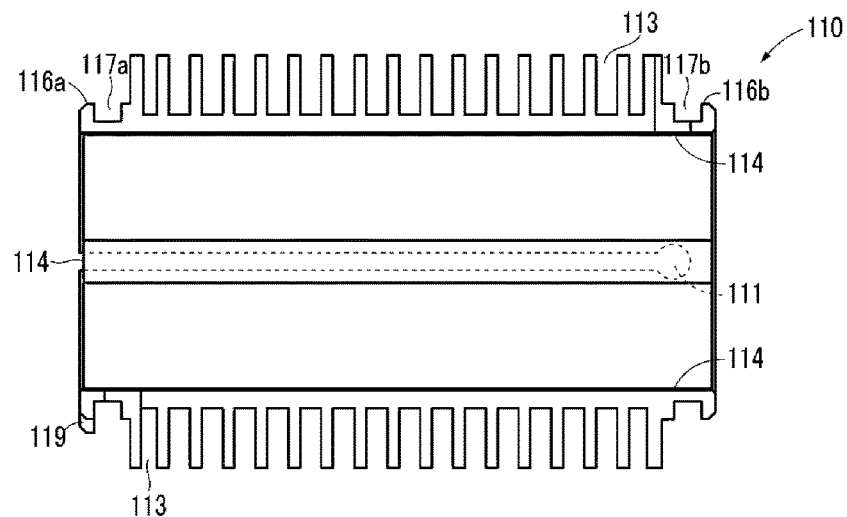
FIG. 3(a) is a sectional view of a holding member of the apparatus shown in FIG. 1.
Figure 3B:
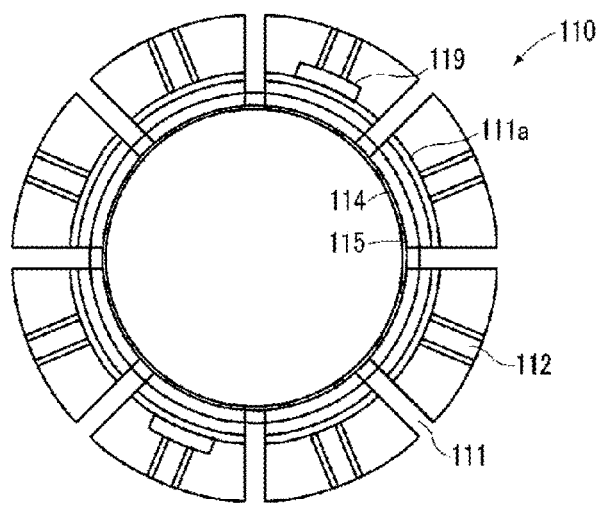
FIG. 3(b) is a view showing the holding member, which is seen from a base end thereof.
Figure 3C:
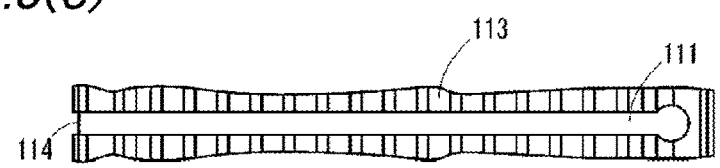
FIG. 3(c) is a view showing first slits of the holding member and FIG. 3(d) is a view showing second slits of the holding member.
Figure 3D:
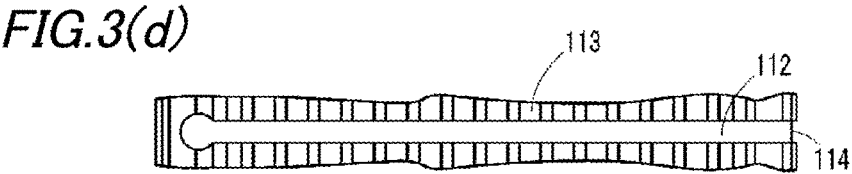

The incident angle α may be about 40°, for example. When the laser beam is output to the workpiece W at the irradiation position P2 with the incident angle α, the sputters generated due to the irradiation are scattered with being substantially aggregated in two directions of an inner direction d1 and an outer direction d2 of the workpiece W, as shown in FIG. 3(a). For example, when the incident angle α of the laser beam at the irradiation position P2 is 40°, an angle β formed by the inner direction d1 is 40° and an angle γ formed by the outer direction d2 is 42°, regarding the irradiation direction of the laser beam.

Accordingly, regarding the dust collection apparatus 700, an apparatus having a trapping apparatus capable of effectively collecting the sputters scattered in the above directions is adopted. Specifically, the dust collection apparatus 700 has, as the trapping apparatus of the sputters, the box-shaped rectangular parallelepiped dust collection part 701 having an opened upper surface and the flat plate-shaped reflection part 702 that reflects sputters scattering in the outer direction d2 toward the dust collection part 701.

As described above, when the predetermined acute angle θ is formed between the cutting direction of the workpiece and the irradiation direction of the laser beam, the sputters are scattered in a predetermined direction. The predetermined direction is a direction facing the surface of the workpiece W extending over a predetermined range from the irradiation position P2 of the laser beam on the workpiece W to an upstream side of the rotating direction R. Therefore, the trapping apparatus is arranged so that it is positioned in the range of the direction. The surface of the workpiece W extending over the predetermined range corresponds to a surface that is included from the irradiation position P2 to about 100° at the central angle of the workpiece W.

That is, the dust collection apparatus 700 is arranged at a position at which the dust collection part 701 is positioned below the holder 100 and the reflection part 702 can reflect the sputters scattering in the outer direction d2 toward the dust collection part 701. The dust collection part 701 has a size that can collect the sputters, which are scattered in the inner direction d1, collide with the holder 100 and are thus reflected and descend downwards, without difficulty. The reflection part 702 has a size that can reflect the sputters, which are scattered in the outer direction d2, toward the dust collection part 701 without omission.

In the above configuration, when cutting the workpiece W, the workpiece W is first mounted on the holding member 110 so that the inner periphery of the workpiece W is opposed to the outer periphery of the holding member 110. At this time, as shown in the lower half part of the central line C of FIG. 2, the first diameter changing member 130 and the second diameter changing member 140 are spaced and the holding member 110 is contracted in the radial direction by the O-rings 118.

Then, as shown in the upper half part of the central line C of FIG. 2, the nut 180 is rotated, so that the second diameter changing member 140 is displaced in the direction of the first diameter changing member 130. Accompanied by this, the coil spring 160 is compressed. Thereby, the first diameter changing member 130 and the second diameter changing member 140 are displaced in the direction of coming close to each other. Thus, the diameter of the pressing member 120 is enlarged by the force applied from the conical surfaces 131, 141 of the first diameter changing member 130 and the second diameter changing member 140.

When the diameter of the pressing member 120 is enlarged, the inner wall of the holding member 110 is pressed by the side surface of the pressing member 120, so that the diameter of the holding member 110 is enlarged. At this time, the small diameter portion 116b is fitted in the fitting recess 171 of the cover member 170 and the leading end of the holding member 110 is fixed to the cover member 170 via the O-ring 118.

Thereby, the workpiece W is corrected regarding the distortion caused thereto and is clamped by the holding member 110. After that, the nut 180 may be rotated in the opposite direction, so that the first diameter changing member 130 and the second diameter changing member 140 are spaced by the repulsive force of the coil spring 160 and thus the diameter of the pressing member 120 is returned to its slightly original diameter or returned to its initial diameter.

Then, the motor 400 is driven. Thereby, the workpiece W is rotated through the spindle 300. The rotating speed of the workpiece W is controlled by the controller of the cylindrical workpiece cutting apparatus and is set to be 30 to 200 m/minute in the circumferential direction, for example. Also, the compressed air as the cooling medium is supplied from the air supply source (not shown).

The compressed air that is supplied from the air supply source is supplied to the first slits 111 and the second slits 112 of the holding member 110 and also to the annular recesses 113 through the air supply path 340. At this time, when the diameter of the pressing member 120 has been returned, a slight clearance exists between the holding member 110 and the workpiece W. Therefore, the compressed air being supplied forms an air film in the clearance.

Also, as the compressed air reaches the side wall of the holding member 110, the side wall functions as a chiller having high cooling efficiency. In the meantime, even when the diameter of the pressing member 120 has not been returned, the compressed air is introduced between the holding member 110 and the workpiece W and thus forms the air film.

Thus, the controller of the cylindrical workpiece cutting apparatus refers to the correspondence table and calculates the distance D, based on the material and thickness of the workpiece W, the required slope of the drag line and the rotating speed of the workpiece W (holding member 110) perceived by the controller. Then, the controller controls the XYZ table 600 to translate the processing head 200 so that the processing head 200 is positioned on the line L2 spaced from the line L1 by the distance D, as shown in FIG. 4(a).

Simultaneously, the controller controls the XYZ table 600 to set the position of the processing head 200 in the direction (Z axis direction) of the rotational axis A of the workpiece W to be a position at which the laser beam is output to the workpiece W positioned on the annular recess 113 of the most leading end-side of the holding member 110. Also, the controller sets the position of the processing head 200 in the Y direction to be a position that is appropriate for cutting the workpiece W, depending on the output of the laser sensor 800 or distance D.

Then, the controller controls the processing head 200 to output the laser beam to the workpiece W being rotated. The part of the workpiece W to which the laser beam is output is melted and cut as the temperature thereof is increased. When the workpiece W rotates one revolution, the most leading end-side part of the workpiece W is cut from the other part, as a first metal ring. In the meantime, when the melted metal, which is generated during the cutting, is solidified, the laminated line, i.e., drag line is formed on the workpiece W by the laser beam.

When cutting the workpiece by the laser beam, the sublimated metal gas, which is generated as a part of the workpiece W is sublimated by the irradiation of the laser beam, may be aggregated and attached to the cut part or the melted metal may be attached to the cut part and thus the dross may be attached. The dross attachment is suppressed by the air film formed between the holding member 110 and the workpiece W or injection of an assist gas from the processing head 200.

Also, as shown in FIG. 4(a), the metal melted by the irradiation of the laser beam is scattered as the sputters in the inner direction d1 and the outer direction d2 of the workpiece W. The sputters scattering in the inner direction d1 collide with the holding member 110 and the like and are thus reflected, so that the sputters descend into the dust collection part 701. Also, the sputters scattering in the outer direction d2 are reflected by the reflection part 702 and thus descend into the dust collection part 702. Thereby, the sputters are collected by the dust collection apparatus 700 without difficulty.

At this time, although the sputters scattering in the inner direction d1 of the workpiece W collide with the sheet 114, the sputters are not attached to the sheet 114 and are discharged without trouble by the assist gas injected from the processing head 200 or a purge operation of the compressed air that is supplied to the annular recesses 113 from the air supply path 340. Also, since the sheet 114 is provided, the sputters are not introduced between the holding member 110 and the pressing member 120 or into the base end-side slits or leading end-side slits of the pressing member 120.

Figure 5A:
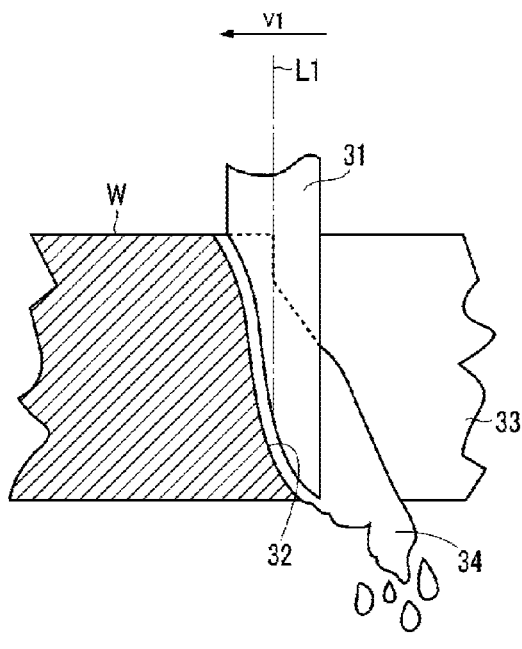
FIG. 5(a) is a view showing an aspect that a workpiece is cut according to the related art.
Figure 5B:
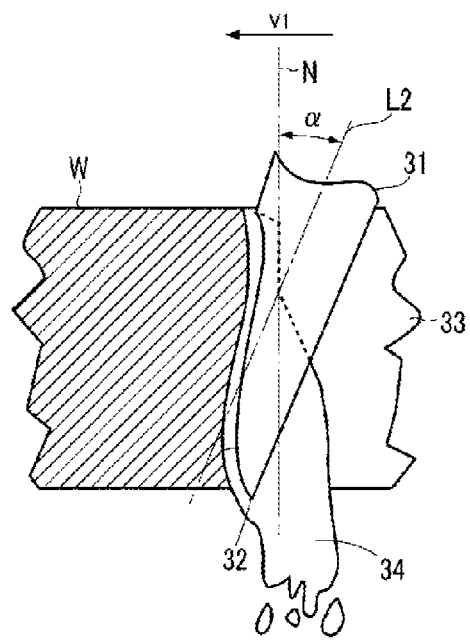
FIG. 5(b) is a view showing an aspect that a workpiece is cut by the apparatus shown in FIG. 1.

FIG. 5 shows an aspect that the workpiece W is cut as described above, compared to the related art. FIG. 5(a) shows an aspect of the related art in which the cutting is made with the processing head 200 being positioned on the line L1 of FIG. 4(a). FIG. 5(b) shows an aspect of this exemplary embodiment in which the cutting is made with the processing head 200 being moved to the position on the line L2.

According to the related art, as shown in FIG. 5(a), the laser beam 31 is incident onto the workpiece W at the incident angle of 0°, i.e., vertically. In this case, a part 32 of the workpiece W in which the laser beam 31 acts to cut the workpiece W and thus the processing is performed is inclined relative to the surface of the workpiece W.

Therefore, a length of the part 32 being processed is relatively long. Thereby, the relatively larger amount of the melted metal is generated, and time during which the melted metal 34 generated stays in a cut part 33 is relatively long. Accordingly, the melted metal 34 is apt to be the dross and to be thus attached to the cut part 33 of the workpiece W. In the meantime, since the drag line is formed along the part 32 being processed, the drag line forms an obtuse angle relative to the cutting direction v1 in a counterclockwise direction, in the related art of FIG. 5(a).

In contrast to this, according to this exemplary embodiment, as shown in FIG. 4(a), the processing head 200 is positioned on the line L2 spaced from the line L1 by the distance D and the laser beam 31 is output along the line L2. Therefore, as shown in FIG. 5(b), the laser beam 31 is incident onto the workpiece W at the incident angle α related to the distance D. That is, the incident direction of the laser beam and the cutting direction v1 form the predetermined acute angle θ(=90°−α). In the meantime, a reference numeral N is a normal line to the surface of the workpiece W.

In this case, the part 32 being processed in which the laser beam 31 acts to cut the workpiece W is substantially perpendicular to the workpiece W. Accordingly, compared to the related art of FIG. 5(a), a length of the part 32 being processed is shorter. That is, the melted metal, which is generated by the processing, is minimal and the time during which the melted metal 34 stays in the cut part 33 is also shortest.

Accordingly, the melted metal 34 is discharged as it is without being attached to the cut part 33 as the dross. That is, the melted metal is smoothly discharged by the purge operation of the air film formed between the holding member 110 and the workpiece W or by the assist gas discharged from the processing head 200.

Figure 6:
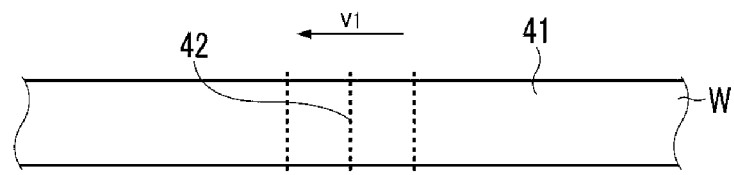
FIG. 6 is a view showing a cut surface of a workpiece cut by the apparatus shown in FIG. 1.

FIG. 6 shows a cut surface 41 of the workpiece W cut as shown in FIG. 5(b). A broken line of FIG. 6 shows the drag line that is formed on the workpiece W. In this exemplary embodiment, as shown in FIG. 6, an angle of the drag line formed on the cut workpiece W is substantially perpendicular to the surface of the workpiece W, as shown with the broken line 42. Also, the dross is not attached to a lower part of the cut surface 41.

When the cutting of the first metal ring is completed, as described above, the processing head 200 is moved along the axial direction of the workpiece W so that it is located at a position corresponding to a next cutting position of the workpiece W. That is, the processing head is moved to a position at which the laser beam is output to the workpiece W positioned on the second annular recess 113 from the leading end of the holding member 110.

At the position, the laser beam is output in the same manner as described above, so that the workpiece W is cut and a second metal ring is thus formed. By doing so, the processing head 200 is sequentially positioned on the annular recesses 113, so that metal rings are formed. During the processing, the position of the processing head 200 in the Y axis direction is kept at the position on the line L2 shown in FIG. 4(a).

Figure 7:
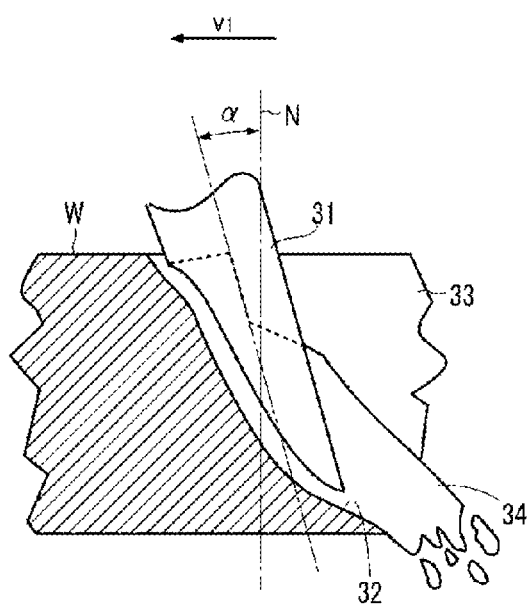
FIG. 7 is a view showing a comparative example regarding the cut example of FIG. 5(b).

FIG. 7 shows a comparative example for this exemplary embodiment. In the comparative example of FIG. 7, it is shown that the workpiece W is cut when the laser beam is made to be incident from a direction opposite to this exemplary embodiment. That is, although the incident angle is the same α as FIG. 5(b), the incident direction of the laser beam and the cutting direction v1 form an obtuse angle (=90°+α) therebetween. The part 32 being processed in which the laser beam 31 acts to cut the workpiece W is considerably inclined relative to the workpiece W.

Accordingly, compared to the exemplary embodiment shown in FIG. 5(b), the part 32 being processed is longer. Thus, the melted metal is more generated by the processing and the time during which the melted metal stays in the cut part 33 is also prolonged. As such, the melted metal 34 is apt to be attached to the cut part 33 as the dross.

Figure 8:
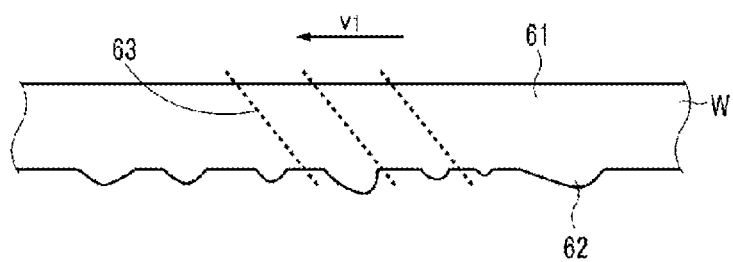
FIG. 8 is a view showing a cut surface of a workpiece that is cut according to the comparative example of FIG. 7.

FIG. 8 shows a cut surface 61 of the workpiece W that is cut according to the comparative example. A large amount of dross 62 is attached to a lower part of the cut surface 61. Also, as shown with a broken line 63 along the drag line, the drag line forms a large obtuse angle in the counterclockwise direction with respect to the cutting direction v1.

As described above, according to this exemplary embodiment, the processing head 200 is translated to the upstream side of the rotating direction of the workpiece W, so that the cutting direction v2 at the irradiation position P2 of the laser beam and the irradiation direction v1 of the laser beam form the predetermined acute angle θ (=90°−the incident angle α). Accordingly, it is possible to reduce the melted metal generated by the irradiation of the laser beam and to rapidly discharge the melted metal. Thus, it is possible to effectively prevent the dross from being attached to the cut part.

In the meantime, in order that the incident angle of the laser beam onto the workpiece W becomes the desired angle α, a method of rotating the processing head 200 to change the irradiation direction of the laser beam may be considered. However, it is difficult to repeatedly perform the operation of rotatably fixing the processing head 200 and precisely inclining the processing head around a central axis of the rotation by a predetermined angle, thereby obtaining the incident angle α, in high precision. This is because an adjustment error of the rotating angle of the processing head 200, which is inevitably caused, is larger as it is more distant from the central axis of the rotation.

Regarding this, according to this exemplary embodiment, as shown in FIG. 4(a), the processing head 200 is translated from the position on the line L1 along which the irradiation direction of the laser beam faces the rotational axis A of the holding member 110 to the position on the line L2 at which the incident angle of the laser beam onto the workpiece W becomes the angle α. Accordingly, it is possible to set the incident angle to be the angle α easily and without difficulty.

That is, the direction and position of the processing head 200 on the line L1 are adjusted in high precision so that the irradiation direction of the laser beam faces the rotational axis A of the holding member 110. Thereby, it is possible to translate the processing head 200 to the position on the line L2 at which the incident angle of the laser beam onto the workpiece W becomes the angle α in relatively high precision by a simple mechanism.

Also, according to this exemplary embodiment, based on the correspondence table, the distance D from the line L1 to the line L2 is acquired in correspondence to the material, thickness, rotating speed and the like of the workpiece W to be processed, the processing head 200 is translated by the distance and then the laser beam is output. Thereby, it is possible to perform the cutting operation of the workpiece W in which the desired slope of the drag line is caused depending on the types of the workpiece W, thereby reducing the attachment amount of the dross.

Also, the trapping apparatus (dust collection part 701, reflection part 702) is arranged so that it is positioned in the range of the direction opposed to the surface of the workpiece W extending over the predetermined range from the irradiation position P2 of the laser beam on the workpiece W to the upstream side of the rotating direction R. Thus, it is possible to effectively collect the sputters.

As described above, according to this exemplary embodiment, the sheet 114 that covers the openings of the first slits 111 and second slits 112 of the holding member 110 is provided between the inner wall of the holding member 110 and the outer wall of the pressing member 120. Thus, it is possible to suppress the sputters, which are generated as the workpiece W is cut, from being introduced between the holding member 110 and the pressing member 120 or into the base end-side slits or leading end-slits of the pressing member 120. Therefore, it is possible to prevent the bad effect of the sputters on the smooth increase/decrease of the diameters of the holding member 110 and the pressing member 120.

Second Exemplary Embodiment

Figure 9A:
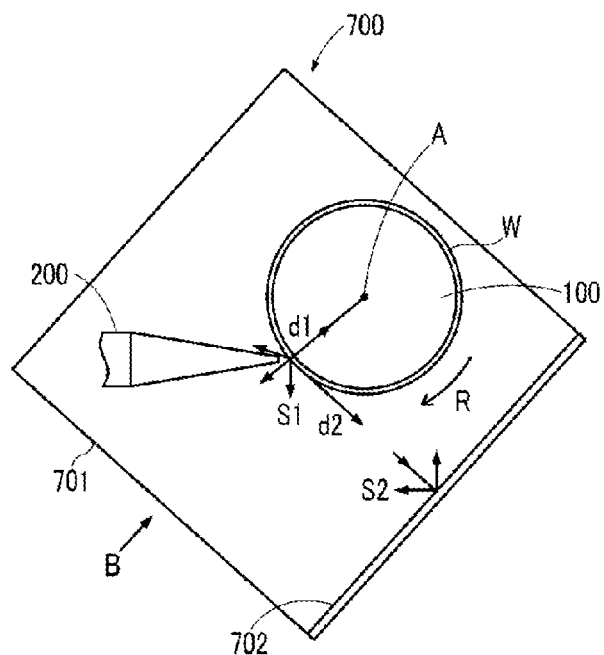
FIG. 9(a) is a view showing arrangement of a workpiece, a processing head and a dust collection apparatus of a cylindrical workpiece cutting apparatus according to a second exemplary embodiment.
Figure 9B:
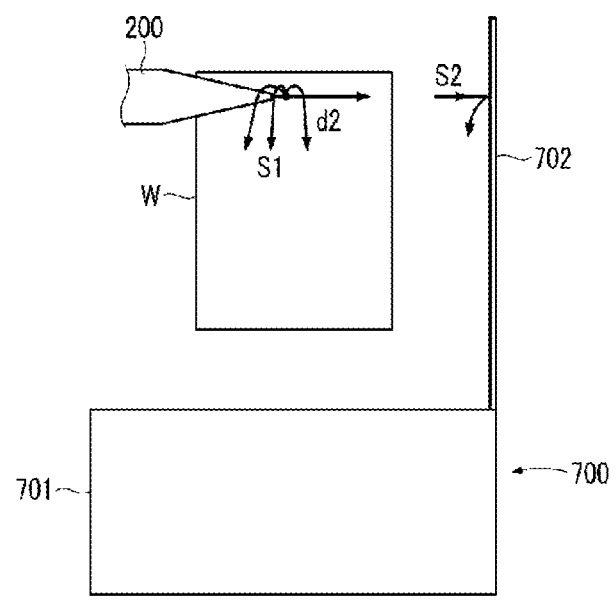
FIG. 9(b) is a view seen from a B arrow direction of FIG. 9(a).

FIG. 9 shows arrangement of the workpiece W, the processing head 200 and the dust collection apparatus 700 of a cylindrical workpiece cutting apparatus according to a second exemplary embodiment. FIG. 9(a) shows the arrangement, which is seen from the above. FIG. 9(b) shows the arrangement, which is shown from a B arrow direction. That is, the direction of the rotational axis A of the workpiece W is a direction following a vertical direction.

The constitutional elements of the cylindrical workpiece cutting apparatus according to this exemplary embodiment are the same as those of FIG. 1. However, the rotation mechanism for the workpiece W such as the motor 400, the spindle 300, the holder 100 and the like is configured to adapt to the direction of the rotational axis A. The positional relation of the processing head 200 relative to the position and rotating direction R of the workpiece W is the same as that of FIG. 4. Accordingly, the sputters that are generated in cutting the workpiece W are scattered in the inner direction d1 and outer direction d2 of the workpiece W, like the exemplary embodiment shown in FIG. 4(a).

As shown in FIG. 9, the dust collection apparatus 700 is provided below the workpiece W. Thereby, the sputters S1, which are scattered in the inner direction d1 of the workpiece W and reflected by the holding member 110 and thus descend, can be directly collected by the dust collection part 701, and the sputters S2 that are scattered in the outer direction d2 can be reflected toward the dust collection part 701 by the reflection part 702 and thus collected. The others are the same as the first exemplary embodiment.

Third Exemplary Embodiment

Figure 10:
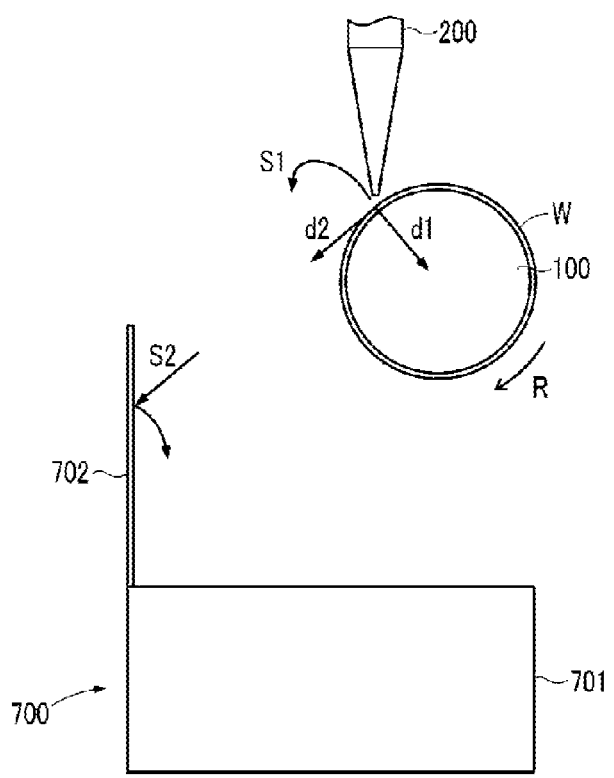
FIG. 10 is a view showing arrangement of a workpiece, a processing head and a dust collection apparatus of a cylindrical workpiece cutting apparatus according to a third exemplary embodiment.

FIG. 10 shows arrangement of the workpiece W, the processing head 200 and the dust collection apparatus 700 of a cylindrical workpiece cutting apparatus according to a third exemplary embodiment. In FIG. 10, the apparatus seen from a front is shown. The constitutional elements of the cylindrical workpiece cutting apparatus according to this exemplary embodiment are the same as those of FIG. 1. However, the processing head 200 is arranged to illustrate the laser beam in the vertical direction from the above. In correspondence to this, the XYZ stage 600 is configured.

The positional relation of the processing head 200 relative to the position and rotating direction R of the workpiece W is the same as that of FIG. 3. Accordingly, the sputters that are generated in cutting the workpiece W are scattered in the inner direction d1 and outer direction d2 of the workpiece W, like the exemplary embodiment shown in FIG. 4(a).

As shown in FIG. 10, the dust collection apparatus 700 is provided below a position at which the laser beam is output to the workpiece W. Thereby, the sputters S1, which are scattered in the inner direction d1 of the workpiece W and reflected by the holding member 110 and thus descend, can be directly collected by the dust collection part 701, and the sputters S2 that are scattered in the outer direction d2 can be reflected toward the dust collection part 701 by the reflection part 702 and thus collected. The others are the same as the first exemplary embodiment.

Figure 11:
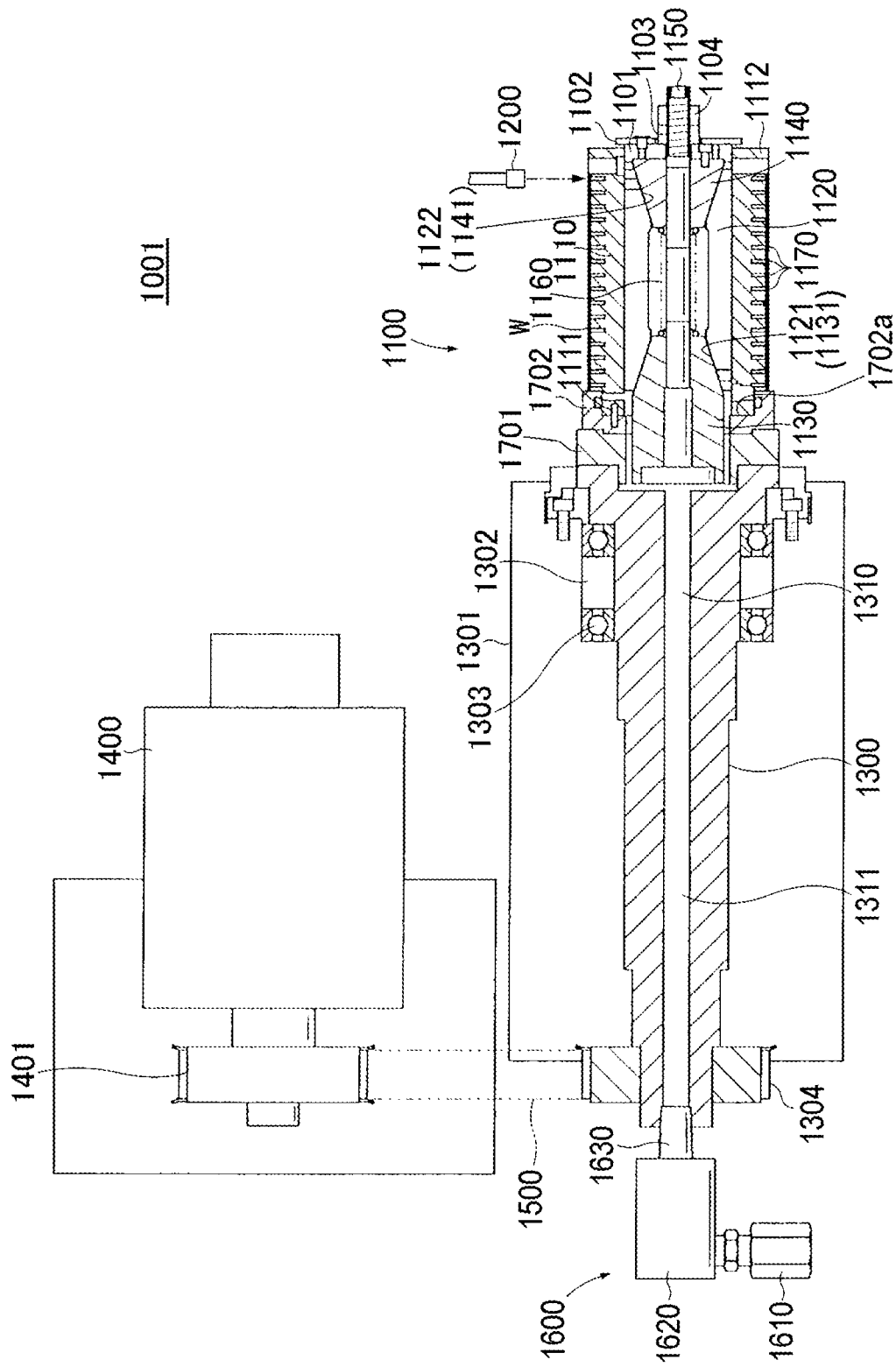
FIG. 11 is an illustrative sectional view of an apparatus of cutting a metal thin plate workpiece according to a fourth exemplary embodiment.

FIG. 11 shows an apparatus 1001 of cutting a metal thin plate workpiece according to a fourth exemplary embodiment. As shown in FIG. 11, the apparatus includes a holder 1100 that holds the workpiece W and is rotatable around the cylindrical axis thereof, a processing head (laser outputting part) 1200 that outputs the laser beam to the workpiece W being rotated by the holder 1100, a spindle 1300 that is connected to a base end-side of the holder 1100 and a motor 1400 that rotates the spindle 1300.

The apparatus 1001 of cutting a metal thin plate workpiece further includes a timing belt 1500 that performs power transmission between the motor 1400 and the spindle 1300 and a pipe joint socket 1600 that supplies the compressed air into the holder 1100 through the spindle 1300.

The workpiece W is formed into a cylindrical shape by bonding both ends of a rectangular metal thin plate. The workpiece is cut to have a predetermined width by the apparatus 1001 of cutting a cylindrical workpiece, so that a metal belt for CVT is prepared. As the metal thin plate, maraging steel having a thickness of about 0.3 to 0.4 mm is used, for example.

The holder 1100 includes a substantially cylindrical holding member 1110 that supports the workpiece W while abutting on an inner surface of the workpiece W, a pressing member 120 having substantially cylindrical shape that presses an inner wall of the holding member 1110, a first diameter changing member 1130 and a second diameter changing member 1140 that have conical surfaces 1131, 1141 for changing a diameter of the pressing member 1120, respectively, and a connection bar 1150 and a coil spring 1160 for adjusting a position between the first diameter changing member 1130 and the second diameter changing member 1140.

A diameter of the conical surface 1131 is gradually reduced from a base end-side of the holding member 1110 toward a leading end-side thereof and a diameter of the conical surface 1141 is gradually reduced from the leading end-side of the holding member 1110 toward the base end-side.

The holding member 1110 is formed with first slits (not shown) from the base end of the holding member to an adjacency of the leading end thereof along the cylindrical axis of the holding member. Also, the same second slits are formed from the leading end-side to an adjacency of the base end. The same numbers of the first slits and the second slits are alternately arranged, respectively, so that the diameter of the holding member 1110 can be elastically expanded and contracted.

An outer periphery of the holding member 1110 is formed with a plurality of annular recesses 1170 at a predetermined interval over its entire circumference. The respective annular recesses 1170 intersect with the first slits and the second slits. The holding member 1110 is connected to the spindle 1300 via two ring-shaped connection members 1701, 1702 fixed to a leading end of the spindle 1300. The connection member 1702 has an annular insertion hole 1702a at an end portion facing the holding member 1110.

The adjacency of the base end of the holding member 1110 is configured by a small diameter portion 1111 having a smaller diameter than the support surface to support the workpiece W. The holding member 1110 is fixed to the connection member 1702 as the small diameter portion 1111 is fitted in the insertion hole 1702a of the connection member 1702. In the meantime, the adjacency of the leading end of the holding member 1110 is configured by a large diameter portion 1111 having a larger diameter than the support surface to support the workpiece W.

An outer periphery of the pressing member 1120 is opposed to an inner wall of the holding member 1110 so that it can press the inner wall. An inner side of the pressing member 1120 facing the base end-side is formed with a conical surface 1121 that is opposed to the conical surface 1131 of the first diameter changing member 1130. In the meantime, an inner side of the pressing member 1120 facing the leading end-side is formed with a conical surface 1122 that is opposed to the conical surface 1141 of the second diameter changing member 1140.

The pressing member 1120 is formed with base end-side slits (not shown) from the base end-side end surface to the adjacency of the leading end along the cylindrical axis thereof. Also, the same leading end-side slits are formed from the leading end-side end surface to the adjacency of the base end. The same numbers, for example, the two base end-side slits and the two leading end-side slits are alternately arranged, respectively, so that the diameter of the pressing member 1120 can be elastically expanded and contracted.

The first diameter changing member 1130 has a cylindrical part at the base end-side and a conical frustum part positioned at a leading end side of the cylindrical part and having the conical surface 1131. A diameter of the cylindrical part and a diameter of a bottom surface of the conical frustum part are the same and both of the parts are connected without a step. The connection bar 1150 penetrates a central axis of the first diameter changing member 1130. A base end portion of the connection bar 1150 is fixed to the base end portion of the first diameter changing member 1130.

The second diameter changing member 1140 has a conical frustum shape and forms the conical surface 1141. The connection bar 1150 penetrates a central axis of the second diameter changing member 1140. The coil spring 1160 is interposed between the first diameter changing member 1130 and the second diameter changing member 140 having the conical frustum, thereby urging the diameter changing members in a direction away from the diameter changing members. The connection bar 1150 penetrates the inside of the coil spring 1160.

A disc member 1101 having a diameter corresponding to an inner diameter of the holding member 1110 is fixed to the bottom surface of the second diameter changing member 140 having the conical frustum shape. A disc-shaped cover member 1102 is fixed to an outer side of the disc member 1101. A diameter of the cover member 1102 is larger than the inner diameter of the holding member 1110. Accordingly, the cover member 1102 is always positioned on an end surface of the holding member 1110.

The connection bar 1150 penetrates centers of the disc member 1101 and the cover member 1102. By two nuts 1103, 1104 fitted on a part of the connection bar 1150 adjacent to an outer side of the cover member 1102, it is possible to adjust a position of the first diameter changing member 1130 relative to the cover member 1102.

The spindle 1300 is supported by a support member 1302 on a basis 1301. A bearing 1303 is interposed between the support member 1302 and the spindle 1300. Thereby, the spindle 1300 is adapted to rotate around a rotational axis thereof.

The spindle 1300 is formed with a through-hole 1311 on a central axis thereof so as to supply air into the holder 1100. A gap is formed between the cylindrical part of the first diameter changing member 1130 and the spindle 1300, the first connection member 1701, the second connection member 1702 and the base end portion of the holding member 1110. The through-hole 1311 communicates with the gap. Thereby, an air supply path 1310 is formed from the through-hole 1311 of the spindle 1300 to the first slits and second slits of the holding member 1110.

A rotational shaft of the motor 1400 and the spindle 1300 are provided with pulleys 1401, 1304, respectively. The timing belt 1500 extends between the pulleys 1401, 1304. Thereby, the spindle 1300 is adapted to rotate as the motor 1400 rotates.

The pipe joint socket 1600 has a main body part 1620 to which an air line (not shown) is connected via a pipe joint 1610 and a socket part 1630 that is connected to the main body part 1620. The socket part 1630 is inserted into an end portion of the through-hole 1311 opposite to the holder 1100. The air line (not shown) is connected to a compressed air supply source that supplies compressed air as cooling medium.

Figure 12:
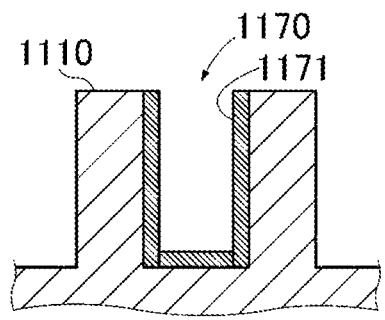
FIG. 12 is a sectional view of a main part of the apparatus of cutting a metal thin plate workpiece according to a fourth exemplary embodiment.

As shown in FIG. 12, the annular recess 1170 is provided at its surface with a cover portion 1171. As the cover portion 1171, a fluorine resin, a boron nitride film or copper plate may be exemplified. The copper plate may be a copper alloy plate.

In the below, the operations of the apparatus of cutting a metal thin plate workpiece of the fourth exemplary embodiment are described.

When cutting the workpiece W, the holding member 1110 is inserted to the workpiece W from the small diameter portion 1111 until the end portion of the workpiece W abuts on the large diameter portion 1112. Then, the holding member 1110 is connected to the connection member 1702. Thereby, the workpiece W is held by the apparatus 1001 of cutting a metal thin plate workpiece.

Then, the nuts 1103, 1104 are rotated to displace the first diameter changing member 1130 in the direction of the cover member 1102. Accompanied by this, the coil spring 1160 is compressed. Thereby, the first diameter changing member 1130 and the second diameter changing member 1140 are displaced in the direction of coming close to each other. Thus, the diameter of the pressing member 1120 is enlarged by the force that is applied in the diameter enlarging direction through the conical surfaces 1131, 1141 of the first diameter changing member 1130 and the second diameter changing member 1140.

When the diameter of the pressing member 1120 is enlarged, the inner wall of the holding member 1110 is pressed by the side surface of the pressing member 1120, so that the diameter of the holding member 1110 is enlarged. Thereby, the distortion of the workpiece W is corrected. After that, the nuts 1103, 1104 may be rotated in the opposite direction, so that the first diameter changing member 1130 and the second diameter changing member 1140 are spaced by the repulsive force of the coil spring 1160 and thus the diameter of the pressing member 1120 is returned to its slightly original diameter or returned to its initial diameter.

Then, the motor 1400 is driven. Thereby, the workpiece W is rotated through the spindle 1300. The rotating speed of the workpiece W is controlled by a controller (not shown) and is set to be 30 to 200 m/minute in the circumferential direction, for example.

Thereby, the controller (not shown) translates the processing head 1200, based on the material and thickness of the workpiece W, the required slope of the drag line and the rotating speed of the workpiece W (holding member 1110) perceived by the controller.

Then, the laser beam is output to the workpiece W from the processing head 1200. The part of the workpiece W to which the laser beam is output is melted as the temperature thereof is increased. Thereby, a part of the workpiece W is cut from the other part, as a metal ring.

A part of the workpiece W is scattered as particles of the melted metal by the irradiation of the laser beam. The particles of the melted metal are attached and solidified on surfaces of the annular recesses 1170, so that the particles may be deposited in the annular recesses 1170.

However, according to the apparatus 1001 of cutting a metal thin plate workpiece of the fourth exemplary embodiment, the surface of the annular recess 1170 is covered with the cover portion 1171. Accordingly, since the metal particles are prevented from being attached on the surfaces of the annular recesses 1170 by the cover portion 1171, it is possible to easily remove the metal particles solidified in the annular recesses 1170 by an air blowing process. As a result, it is possible to prevent the moving of the workpiece W or metal ring relative to the holder 1100 from being impeded or the workpiece or metal ring from being damaged.

Also in the fourth exemplary embodiment, like the first exemplary embodiment, the sheet member that prevents the sputters, which are generated in cutting the workpiece W, from being introduced into the slits 111, 112 may be provided between the inner wall of the holding member 1110 and the outer wall of the pressing member 1120.

Also in the fourth exemplary embodiment, like the first to third exemplary embodiments, the dust collection apparatus may be provided.

Like the fourth exemplary embodiment, also in the first to third exemplary embodiments, the cover portion may be provided to the annular recesses 113.

In the below, regarding the fourth exemplary embodiment, embodiments and comparative examples are described.

Embodiment 1

A fluorine resin plate (Misumi Co., Ltd., product name: PTFE standard) was adhered on the surfaces of the annular recesses 170, so that the cover portion 1171 made of the fluorine resin was provided.

Then, the workpiece W of 30 workpieces was cut in accordance with the above described sequence by using the apparatus 1001 of cutting a meal thin plate workpiece having the cover portion 1171 formed thereto. After the cutting, the states of the annular recesses 1170 were observed with naked eyes before and after the air blowing process.

Embodiment 2

The embodiment 2 is the same as the embodiment 1, except that boron nitride coating agent (Okitsumo Inc., product name: boron coat A) was sprayed on the surfaces of the annular recesses 1170 at room temperatures and dried for five minutes and thus the cover portion 1171 made of a boron nitride film was provided. The states of the annular recesses 1170 were observed in the same manner as the embodiment 1.

Embodiment 3

The embodiment 3 is the same as the embodiment 1, except that an oxygen-free copper plate (C1020) was adhered on the surfaces of the annular recesses 1170 and thus the cover portion 1171 made of the copper plate was provided. The states of the annular recesses 1170 were observed in the same manner as the embodiment 1.

Comparative Example

The comparative example is the substantially same as the embodiment 1, except that a stainless steel plate (Daido Steel Co., Ltd., product name: NAK55) was adhered on the surfaces of the annular recesses 1170 and the cover portion 1171 made of the stainless steel was thus provided. The states of the annular recesses 1170 were observed in the same manner as the embodiment 1.

As a result of the observation, in the embodiment 1 in which the cover portion 1171 made of the fluorine resin was provided, in the embodiment 2 in which the cover portion 1171 made of the boron nitride film was provided and in the embodiment 3 in which the cover portion 1171 made of the copper plate was provided, it was not possible to substantially observe the attachment of the metal particles to the annular recesses 1170 after the air blowing process. Particularly, in the embodiment 1 in which the cover portion 1171 made of the fluorine resin was provided, it was not possible to observe the attachment of the metal particles to the annular recesses 1170 even before the air blowing process.

On the other hand, in the comparative example in which the cover portion 1171 made of the stainless steel was provided, many metal particles were attached to the surfaces of the annular recesses 1170 after the air blowing process.

Accordingly, it is clear that it is possible to prevent the melted metal from being attached to the annular recesses 1170 by providing the cover portion 1171 made of the fluorine resin, the boron nitride film or copper plate.

In accordance with the above exemplary embodiments, the cylindrical workpiece cutting apparatus may include the holder 100, 1100 in which the metal made cylindrical workpiece W is mounted on the outer periphery thereof and which is adapted to hold the workpiece W over the entire length of the workpiece, the annular recesses 113, 1170 that are formed on the outer periphery of the holder 100, 1100 over the entire circumference of the holder at a predetermined interval, the laser outputting part 200, 1200 that is provided at the position opposed to the holder 100, 1100 with the workpiece W being interposed therebetween and outputs the laser beam to the workpiece W, and the cover portion 1171 that is provided on the surfaces of the annular recesses 113, 1170 and prevents the attachment of the metal particles, which are scattered when cutting the workpiece by the laser beam.

According to this structure, since the holder has the annular recesses, the metal particles, which are generated when the workpiece is cut by the laser beam, are scattered to the annular recesses. At this time, since the annular recesses are provided on the surfaces thereof with the cover portion, the metal particles are prevented from being attached to the annular recesses. Therefore, even when the metal particles are deposited into the annular recesses, it is possible to easily remove the deposited particles, so that it is possible to prevent the contact of the holder and the workpiece or metal ring.

In the above structure, the cover portion 1171 may be made of the fluorine resin. The cover portion 1171 may be made of the boron nitride film. The cover portion 1171 may be made of the copper plate.

In accordance with the above exemplary embodiments, in the cylindrical workpiece cutting apparatus which has the holder 100, 1100 that holds the metal made cylindrical workpiece W and in which the workpiece is cut W into metal rings by the laser beam output onto the workpiece W while rotating the holder 100, 1100, the holder 100, 1100 may include the hollow cylindrical holding member 110, 1110 that has the cylindrical outer wall, which can be expanded and contracted in the radial direction, and holds the workpiece W from the inner wall-side of the workpiece by the cylindrical outer wall, the pressing member 120, 1120 that has the inner conical surfaces 121, 122, 1121, 1122 formed on the inner surface thereof and the cylindrical outer wall and enlarges the diameter of the holding member 110, 1110 as the cylindrical outer wall presses the inner wall of the holding member 110, 1110, and the diameter changing members 130, 140, 1130, 1140 that have the outer conical surfaces 131, 141, 1131, 1141 corresponding to the inner conical surfaces 121, 122, 1121, 1122 and enlarge the diameter of the pressing member 120, 1120 as the outer conical surfaces 131, 141, 1131, 1141 moves axially. The holding member 110, 1110 may alternately have, in the circumferential direction, the first slits 111 that are provided from one end portion to the adjacency of the other end portion along the axial direction and the second slits 112 that are provided from the other end portion to the adjacency of the one end portion. The sheet member 114 that prevents the sputters, which are generated when cutting the workpiece W, from being introduced to the inside through the slits 111, 112 of the holding member 110, 1110, may be provided between the inner wall of the holding member 110, 1110 and the outer wall of the pressing member 120, 1120. The pressing member 120, 1120 may alternately have, in the circumferential direction, the slits that are provided from one end portion to the adjacency of the other end portion along the axial direction and the slits that are provided from the other end portion to the adjacency of the one end portion, so that the pressing member may be elastically expanded and contracted in the radial direction.

According to the above structure, since the sheet member is provided, it is possible to prevent the sputters, which are scattered into the slits of the holding member, from being further introduced into the slits and the like of the pressing member. Accordingly, it is possible to prevent the bad effect of the sputters on the expansion and contraction of the holding member or pressing member.

In accordance with the above exemplary embodiments, the cylindrical workpiece cutting apparatus in which the metal made cylindrical workpiece W is cut into ring shapes to form metal rings, may include the holder 100 that holds the cylindrical workpiece W, the laser outputting part 200 that outputs the laser beam to the workpiece W that is held and being rotated by the holder 100, the position control mechanism 600 that controls a position of the laser outputting part 200 so that the cutting direction v1 of the workpiece at the irradiation position of the laser beam on the workpiece and the irradiation direction v2 of the laser beam form the predetermined acute angle θ, before the irradiation of the laser beam, and the dust collection apparatus 700 that collects the sputters that are scattered in the direction corresponding to the position of the laser outputting part 200 controlled by the position control mechanism 600, when cutting the workpiece.

When the workpiece is cut by the irradiation of the laser beam, the drag line is formed on the cut surface. The drag line is a laminated line that is formed when the melted metal is solidified. The slope of the drag line relates to an angle that is formed by the cutting direction of the workpiece at the irradiation position of the laser beam on the workpiece and the irradiation direction of the laser beam. Also, as the angle of the drag line relative to the workpiece surface is more vertical, the attachment amount of the dross is less.

Accordingly, it is possible to reduce the attachment amount of the dross by selecting the predetermined acute angle so that the angle of the drag line relative to the workpiece surface is as vertical as possible and controlling the position of the laser outputting part for the predetermined acute angle.

The predetermined acute angle can be obtained, based on the trials in which the workpiece is cut while variously changing the acute angle formed by the cutting direction and the irradiation direction and the slopes of the drag lines obtained by the trials or the attachment amounts of the dross. In the meantime, the predetermined acute angle is different depending on the material or rotating speed of the workpiece, the intensity of the laser beam and the like.

When the laser beam is output so that the predetermined acute angle is obtained, the generated sputters are scattered with being substantially aggregated in two directions of the inner direction and outer direction of the workpiece. The two directions are directions of two angles different depending on the predetermined acute angle. The sputters that are scattered in the inner direction of the workpiece collide with the rotation mechanism for rotating the workpiece and are thus reflected, so that the sputters descend downwards. The sputters that are scattered in the outer direction of the workpiece are scattered in the corresponding outer direction when there is no obstacle.

Accordingly, by controlling the position of the laser outputting part so that the cutting direction of the workpiece and the irradiation direction of the laser beam form the predetermined acute angle, it is possible to limit the scattering directions of the sputters to the two directions corresponding to the position after the control. Also, it is possible to effectively collect the sputters by arranging the dust collection apparatus, which has a shape and a size capable of collecting the sputters being scattered in the two directions without difficulty, at an appropriate position.

In the meantime, the dust collection apparatus 700 may have the trapping apparatus 701, 702 that traps the sputters being scattered in the direction corresponding to the position of the laser outputting part 200. The trapping apparatus 701, 702 may be provided over the range opposing to a predetermined surface of the workpiece. The predetermined surface on the workpiece may be a surface on the workpiece that extends over a predetermined range from the irradiation position of the laser beam on the workpiece by the laser outputting part 200 whose position has been controlled by the position control mechanism 600 to the upstream side of the rotating direction.

When the position of the laser outputting part is controlled so that the cutting direction of the workpiece and the irradiation direction of the laser beam form the predetermined acute angle, the scattering directions of the sputters are opposed to the predetermined surface on the workpiece. Thus, according to the above structure, since the trapping apparatus exists in the range of the directions, it is possible to effectively collect the sputters.

What is claimed is:

1. A cylindrical workpiece cutting apparatus, in which a metal made cylindrical workpiece is cut into a plurality of metal rings, the apparatus comprising:
 a holder adapted to hold the cylindrical workpiece;
 a laser outputting part adapted to output laser beam from a direction perpendicular to a direction along a horizontally oriented rotating axis of the workpiece to the workpiece held and rotated by the holder;
 a position control mechanism adapted to control the laser outputting part to be translated in a vertical direction along the axis of rotation of the workpiece from a first position where an irradiation direction of the laser beam is on a line intersecting with the rotational axis of the workpiece at a right angle to a second position at an upstream side of the rotating direction of the workpiece so that a predetermined acute angle is formed between a cutting direction of the workpiece, corresponding to a tangent direction of an outer circumference of the workpiece, at an irradiation position of the laser beam on the workpiece and an irradiation direction of the laser beam, before the irradiation of the laser beam, and
 a dust collection apparatus that collects sputters scattered in a range that is determined based on at least one of a slope of a drag line caused on the workpiece and a height of a dross attached to a cut part of the workpiece, during cutting of the workpiece,
 wherein the dust collection apparatus includes:
 a dust collection part configured to collect sputters which are scattered in an inner direction of the workpiece, colliding with the holder, being reflected by the holder, and descending downward, and
 a reflection part configured to reflect the sputters which are scattered in an outer direction of the workpiece to the dust collection part.

2. The apparatus according to claim 1, wherein the dust collection apparatus has a trapping apparatus adapted to trap the sputters scattered in the direction corresponding to the position of the laser outputting part, and
 wherein the dust collection part and the reflection part are provided over a range opposing to a predetermined surface on the workpiece, and wherein said predetermined surface on the workpiece is a surface on the workpiece that extends over a predetermined range from the irradiation position of the laser beam on the workpiece by the laser outputting part whose position has been controlled by the position control mechanism to an upstream side of a rotating direction.

* * * * *